United States Patent
Moine et al.

(10) Patent No.: US 12,403,652 B2
(45) Date of Patent: Sep. 2, 2025

(54) METHOD FOR DETERMINING THE PRIORITY AND THE POSITION OF THREE-DIMENSIONAL PRODUCTS IN AN ADDITIVELY MANUFACTURING PROCESS

(71) Applicant: ESSILOR INTERNATIONAL, Charenton-le-Pont (FR)

(72) Inventors: Jérôme Moine, Charenton-le-Pont (FR); Mathieu Feuillade, Charenton-le-Pont (FR); Pascale Goutal, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 117 days.

(21) Appl. No.: 17/257,703

(22) PCT Filed: Jul. 1, 2019

(86) PCT No.: PCT/EP2019/067604
§ 371 (c)(1),
(2) Date: Jan. 4, 2021

(87) PCT Pub. No.: WO2020/007797
PCT Pub. Date: Jan. 9, 2020

(65) Prior Publication Data
US 2021/0291442 A1    Sep. 23, 2021

(30) Foreign Application Priority Data
Jul. 2, 2018  (EP) ..................................... 18305847

(51) Int. Cl.
*B29C 64/176*  (2017.01)
*B29C 64/393*  (2017.01)
(Continued)

(52) U.S. Cl.
CPC .......... *B29C 64/176* (2017.08); *B29C 64/393* (2017.08); *B33Y 10/00* (2014.12);
(Continued)

(58) Field of Classification Search
None
See application file for complete search history.

(56) References Cited

U.S. PATENT DOCUMENTS

| 2009/0037011 A1 | 2/2009 | Spiridonov et al. |
| 2011/0033887 A1* | 2/2011 | Fang .................. B81C 99/0095 73/1.01 |

(Continued)

FOREIGN PATENT DOCUMENTS

| CN | 106003713 | 10/2016 |
| JP | 2012096427 A | 5/2012 |

OTHER PUBLICATIONS

International Search Report for PCT/EP2019/067604, mailed Nov. 7, 2019, 7 pages.
(Continued)

*Primary Examiner* — Alexander M Weddle
(74) *Attorney, Agent, or Firm* — NIXON & VANDERHYE (57) ABSTRACT

Disclosed is a method implemented by computer for determining a batch of a number n>1 of three-dimensional products to be manufactured by an additive manufacturing technology, the method including: —a step of receiving at least one order for manufacturing a product by the additive manufacturing technology; —a step of determining a score associated with the product from a set of data included in the at least one order, the score being representative of at least one product's characteristic; —a step of assigning to the batch n products having a corresponding score; and—a step (Continued)

of providing an additive manufacturing machine with the set of data of each product assigned to the batch.

15 Claims, 4 Drawing Sheets

(51) Int. Cl.
    *B33Y 10/00*     (2015.01)
    *B33Y 30/00*     (2015.01)
    *B33Y 50/02*     (2015.01)
    *B29L 11/00*     (2006.01)

(52) U.S. Cl.
    CPC ............... *B33Y 30/00* (2014.12); *B33Y 50/02* (2014.12); *B29L 2011/0016* (2013.01)

(56) References Cited

U.S. PATENT DOCUMENTS

| | | | |
|---|---|---|---|
| 2013/0041629 A1* | 2/2013 | Fisker | A61C 13/0004 703/1 |
| 2015/0057784 A1 | 2/2015 | Butler et al. | |
| 2015/0253585 A1 | 9/2015 | Anatole et al. | |
| 2016/0101573 A1* | 4/2016 | Quere | B29D 11/00961 425/166 |
| 2016/0161761 A1* | 6/2016 | Quere | G02C 7/027 427/164 |
| 2016/0207258 A1* | 7/2016 | Handa | B29C 64/182 |
| 2016/0279880 A1 | 9/2016 | Zeng et al. | |
| 2017/0173888 A1* | 6/2017 | Thomas-Lepore | H04L 51/52 |
| 2017/0246851 A1* | 8/2017 | Kritchman | G06F 30/00 |
| 2017/0305067 A1 | 10/2017 | Cortes et al. | |

OTHER PUBLICATIONS

Freens et al., "Automating the Production Planning of a 3D Printing Factory", 2015 Winter Simulation Conference, IEEE, Dec. 6, 2016, pp. 2136-2147.

European Search Report for EP18305847.8 dated Mar. 6, 2019, 19 pages.

Communication pursuant to Article 94(3) EPC in European Patent Application No. 19 733 529.2 dated Sep. 5, 2023.

* cited by examiner

METHOD FOR DETERMINING THE PRIORITY AND THE POSITION OF THREE-DIMENSIONAL PRODUCTS IN AN ADDITIVELY MANUFACTURING PROCESS

This application is the U.S. national phase of International Application No. PCT/EP2019/067604 filed Jul. 1, 2019 which designated the U.S. and claims priority to EP Patent Application No. 18305847.8 filed Jul. 2, 2018, the entire contents of each of which are hereby incorporated by reference.

The invention relates to the field of the manufacture of three-dimensional products obtained at least partly by additive manufacturing. More particularly, the invention relates to a method for determining a batch of three-dimensional products to be manufactured by an additive manufacturing technology.

Methods for manufacturing three-dimensional products, as ophthalmic lenses, with an additive manufacturing process may comprise the generation of a plurality of predetermined volume elements to form a plurality of layers. The three-dimensional products are thus generated by adding thin layers of material one on top of the other. The generation of the plurality of predetermined volume elements generally involves a relative displacement of a support onto which the predetermined volumes elements are generated and a manufacturing head. Depending on the type of additive manufacturing process, this manufacturing head may aim at depositing fused material on the support or irradiating an area of the support already provided with material to be irradiated.

To improve the manufacturing productivity, it is known to gather a predetermined number of three-dimensional products in batches and to manufacture all three-dimensional products in a same additively manufacturing step. However, when three-dimensional products have different dimensions and characteristics, for example different heights, the displacements of the manufacturing head with regard to the support may lead to a decrease of the productivity.

A problem that the invention aims to solve is thus to provide a method for improving the productivity of additively manufacturing.

To solve this problem, the invention provides a method implemented by computer means for determining a batch of a number n>1 of three-dimensional products to be manufactured by an additive manufacturing technology, said method comprising:
  a step of receiving at least one order for manufacturing a product by the additive manufacturing technology;
  a step of determining a score associated with said product from a set of data comprised in said at least one order, said score being representative of at least one product's characteristic;
  a step of assigning to said batch n products having a corresponding score,
  a step of providing an additive manufacturing machine with the set of data of each product assigned to the batch.

Setting-up a batch with predetermined products having corresponding score, thus corresponding characteristics, allows to optimize the organization of said batch. This optimization is strengthened by considering at the same time the delivery priority of these products to guarantee both the productivity of the manufacturing process and a successful delivery of the ordered products.

According to an embodiment of said determining method, the score is determined depending on at least one among:
  at least one geometric characteristic of the product,
  at least one added value to be provided to the product,
  at least one manufacturing characteristic of the product, and
  the priority with which the product is to be manufactured.

According to an embodiment of said determining method, the three-dimensional products are ophthalmic lenses.

According to an embodiment of the determining method:
  the at least one geometric characteristic comprises the power of the ophthalmic lens, the curvature of a first and/or second faces of the ophthalmic lens and at least one dimension of the ophthalmic lens,
  the at least one added value is one among an anti-scratch layer, an anti-shock layer, a tinted layer or dye, a photochromic layer or dye, a polarized layer, an antistatic layer, an anti-reflective layer or stack, a mirrors or partial mirror layer and a filtering layer,
  the at least one manufacturing characteristic comprises a minimum number of layers required to manufacture the three-dimensional product, a maximum number of layers required to manufacture the three-dimensional product, a post-processing operation, the nature of a base lens on which the lens is to be manufactured and the material of the lens.

According to an embodiment of said determining method, it further comprising a step of determining a rank for said product in an ordered product list according to said determined score, each product being assigned to said batch depending on his rank in the ordered product list.

According to an embodiment of said determining method, it further comprising a step of determining for each product assigned to said batch positioning spatial parameters of the product with regard to a manufacturing support of the additive manufacturing machine depending on the determined score.

According to an embodiment of said determining method, said manufacturing support defining a first surface axis, a second surface axis and a depth axis orthogonal to the first and second surface axes, wherein said positioning spatial parameters comprise the position and/or the orientation of the product with regard to the first surface axis, the second surface axis and the depth axis.

According to an embodiment of said determining method, it further comprising a step of determining an operation scope of an additive manufacturing nozzle onto the manufacturing support, the orientation of the product being determined to optimize the operation scope of the additive manufacturing nozzle with regard to the product while reducing the height of said product along the depth axis.

According to an embodiment of said determining method, the position of each product assigned to said batch is determined such that the maximum number of layers decreases along at least one of the first and second surface axes.

According to an embodiment of said determining method, products assigned to said batch are divided in sub-batches having a same range of maximum numbers of layers, a same range of diameters and/or a same range of curvatures.

According to an embodiment of said determining method, it further comprising:
  a step of determining the curvature of a first and a second products assigned to the batch,
  if the first and second products have a same curvature, a step of determining the height of the first and second products between an upper and a lower points along the depth axis, if the first and second products have a different height, a step of positioning first and second products with regard to the manufacturing support such that the upper point of both the first and the second products are positioned at a same height along the depth axis.

According to an embodiment of said determining method, it further comprises:
  a step of determining the curvature of a first and a second products assigned to the batch,
  if the first and second products have a same curvature, a step of determining the height of the position of the optical centers of the first and second products with respect to a lower point along the depth axis,
  if the optical centers of the first and second products are positioned at a different height, a step of positioning first and second products with regard to the manufacturing support such that the optical centers of both the first and the second products are positioned at a same height along the depth axis.

According to an embodiment of said determining method, the position of each product assigned to said batch is determined such that the maximum number of layers decreases:
  along the first and second surface axes from a central point of the manufacturing support to form a quasi-concentric distribution, or
  along the first or second surface axis from a side area of the manufacturing support to form a strip distribution, or
  from a central point of the manufacturing support to form a spiral distribution.

According to an embodiment of said determining method, ordered products comprise a pair of a left lens and a right lens of at least a same optical device, the position of said left and right lenses of a same pair being determined to be adjacent to each other in the additive manufacturing machine.

According to an embodiment of said determining method, it further comprising a step of determining if said products comprise a concave and/or a convex surface, the position and the orientation of the products in the additive manufacturing machine being determined such that a concave surface of a product is adjacent to and faces a convex surface of another product.

The invention further provides a method of manufacturing an ophthalmic lens having at least one optical function, comprising:
  a step of providing an additive manufacturing machine comprising a manufacturing support,
  a step of determining a batch of products to be manufactured onto the manufacturing support as described above,
  a step of additively manufacturing the batch of products by depositing a plurality of predetermined volume elements forming a plurality of layers on the manufacturing support to obtain a plurality of ophthalmic lens.

The invention also provides a system for manufacturing in parallel a batch of a number n>1 of three-dimensional products by an additive manufacturing technology, said system comprising:
  an elevator platform and a manufacturing support supported on said elevator platform,
  means for selectively directing a light beam to a curable material under liquid form and curing the curable material,
  a controller, adapted for setting a plurality of placement zones in the formation area, wherein the placement zones are defined by borderlines extending in an extension direction of a recoater for leveling a liquid surface, wherein said controller comprises
    means for receiving orders for manufacturing a three-dimensional product by the additive manufacturing technology;
    means for determining a score associated with said three-dimensional product from a set of data comprised in said order, said score being representative of at least one product's characteristic;
    means for assigning to said batch n products having a corresponding score, when said ordered three-dimensional product list comprises at least n three-dimensional products;
    means for placing three-dimensional products of said batch on the manufacturing support according to said determined score;
  an additive manufacturing machine for manufacturing the ordered three-dimensional products.

The invention is described in more detail below by way of the figures that show a preferred embodiment of the invention.

Figure 1:
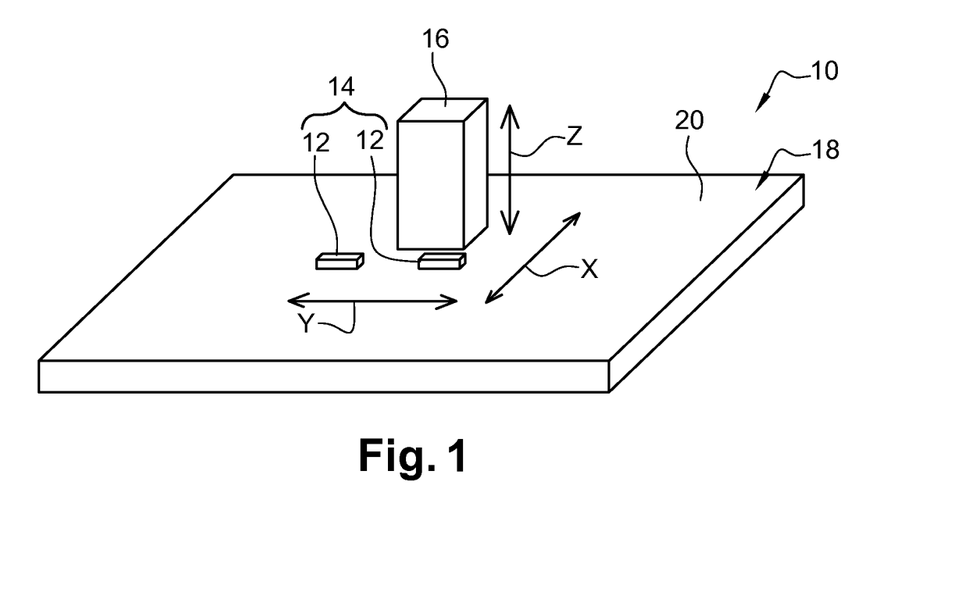
FIG. 1 schematically shows an additive manufacturing system.

As shown on FIG. 1, a system 10 is provided for manufacturing three-dimensional products 12 of a batch 14 using additive manufacturing technology. Three-dimensional products 12 are preferably optical devices, most preferably ophthalmic lenses. The following description is detailed with ophthalmic lenses as three-dimensional products 12 but it should not be considered as a limitation of the present invention.

By "additive manufacturing technology", we mean manufacturing process having a step of generating of a plurality of predetermined volume elements to form a plurality of layers of material one on top of the other. This additive manufacturing process may correspond to a three-dimensional printing, as polymer jetting, a stereolithography method or a method of fused filament fabrication.

In an additive manufacturing method, a manufacturing head 16 is configured to deposit a plurality of predetermined volume elements on a manufacturing support 18. Said manufacturing support 18 defines a first surface axis X, a second surface axis Y and a depth axis Z. The depth axis is preferably orthogonal to the first X and second Y surface axes.

The system 10 comprises means for displacing the manufacturing head 16 with regard to the manufacturing support 18. Preferably, said displacing means are configured to displace the manufacturing head 16 with regard to the support 18 along at least two axes. Most preferably, said displacing means are configured to displace the manufacturing head 16 with regard to the support 18 along said first X and second surface axes and said depth axis Z. Displacing the manufacturing head 16 with regard to the support 18 along axes X and Y allows to form two-dimensional layers. Displacing the manufacturing head 16 with regard to the support 18 along said depth axis Z allows to form a plurality of layers on top of the other to obtain three-dimensional products 12.

The manufacturing support 18 is preferably disposed onto an elevator platform (not shown) which is configured to vary the position of the manufacturing head with regard to the manufacturing support 18 along the depth axis Z. Furthermore, the manufacturing support 18 is preferably positioned in a bath of curable material under liquid form. The manufacturing head 16 is also preferably configured to provide the surface of the curable material with a light beam to generate the predetermined volume elements.

These three-dimensional products 12 are gathered into batches 14. In other words, a predetermined number of said three-dimensional products 12 are brought together to be manufactured during a same manufacturing sequence. Hence, three-dimensional products 12 of a same batch 14 are manufactured on a same support 18.

The invention provides a method implemented by computer means for determining a batch 14, or group, of a number n>1 of three-dimensional products 12 to be manufactured by additive manufacturing technology. Said determining method is preferably configured to be performed by the system 10.

Said determining method comprises a step of receiving at least one order for manufacturing a product by the additive manufacturing technology. A score associated with said product is then determined from a set of data comprised in said at least one order. Said score is representative of at least one product's characteristic. This score may depend on real-time parameters.

Said determining method may further comprises a step of determining a rank for said product 12 in an ordered product list according to said determined score. In this case, each product 12 is assigned to said batch depending on his rank in the ordered product list.

The score is preferably determined depending on at least one among at least one geometric characteristic of the product, at least one added value to be provided to the product, at least one manufacturing characteristic of the product, and the priority with which the product is to be manufactured. The priority preferably corresponds to the latest manufacturing launch date which is determined depending on the expected time to perform all manufacturing steps for a given product 12 and the requested delivery date of the product 12.

Most preferably, the score is determined with different weighting coefficients between said at least one geometric characteristic, said at least one added value, said at least one manufacturing characteristic, and the priority with which the product is to be manufactured. Particularly, the most important weighting coefficient is associated to the priority with which the product is to be manufactured. Then, the weighting coefficients are applied with a decreasing order to said at least one geometric characteristic, to said at least one added value and then to said at least one manufacturing characteristic. For example, the more the height is, the more the score is.

Furthermore, the score may comprise the number of ongoing ordered products 12, the real-time operating states of the manufacturing machines into which the products 12 have to be provided after the additive manufacturing step and the capacity of the computer system. Supplementary manufacturing steps provided after additive manufacturing may comprise the provision added features as a hard coat, an anti-reflective coating or a polarizing film.

When the three-dimensional products 12 are ophthalmic lenses, the at least one geometric characteristic may comprise the power of the ophthalmic lens, the curvature of a first and/or second faces of the ophthalmic lens and at least one dimension of the ophthalmic lens. Preferably, said at least one dimension of the ophthalmic lens comprises the height of the ophthalmic lens. Optimizing the composition of the batches with corresponding heights allows to optimize the displacements of the manufacturing head 16. In other words, manufacturing ophthalmic lenses with corresponding heights may reduce useless or inefficient moves of the manufacturing head 16. Indeed, since the three-dimensional products 12 or ophthalmic lenses are manufactured layer by layer, large height variation may imply supplementary displacements of the manufacturing head 16 when depositing the top layers.

The at least one added value is preferably one among an anti-scratch layer, an anti-shock layer, a tinted layer or dye, a photochromic layer or dye, a polarized layer, an antistatic layer, an anti-reflective layer or stack, a mirrors or partial mirror layer and a filtering layer.

The at least one manufacturing characteristic may comprises a minimum number of layers NMIN required to manufacture the three-dimensional product, a maximum number of layers NMAX required to manufacture the three-dimensional product, a post-processing operation, the nature of a base lens on which the lens is to be manufactured and the material of the lens. Said at least one manufacturing characteristic preferably comprises said minimum number of layers NMIN and said maximum number of layers NMAX for the same reasons as those described above for the height of the ophthalmic lenses. The score may comprise a plurality of components. For example, the score may comprise two components A and B which are determined as proportional to the said minimum number of layers NMIN and said maximum number of layers NMAX, respectively.

The determining method also comprises a step of assigning to said batch 10 a predetermined number n of products 12 having a corresponding score. A "corresponding score" may correspond to a same score or a different score with a predetermined interval. Assigning to a same batch 14 products 12 having a same or similar score allows to obtain a batch with similar characteristics. This allows to optimize the displacements of the manufacturing head 16 thereby reducing the manufacturing time. When the score comprises at least two components, these two or more components may be considered to determine whether two scores are corresponding scores. In the case where the score comprises components A and B, both the minimum number of layers NMIN and the maximum number of layers NMAX are considered to determine if two scores are corresponding scores.

In the case where a number lower to n products 12 is assigned to the batch 14, the process may be stopped until products 12 with corresponding score are assigned to the batch 14 or latest manufacturing launch date is expired.

Then, the system 10 is provided with the set of data of each product 12 assigned to the batch 14. The composition of the batch 14 may vary until the batch 14 is transferred to the system 10 or before on a predetermined time limit. For example, the composition of a batch 14 may be modified depending on real-time capacity of the computer system, e.g. the data stream of the computer system. This allows to guarantee the feasibility and the performance of the data transfer. If the flow stream associated to a batch 14 are too high, the number n of a batch 14 may be reduced to make the transferred data compliant with the capacity of the computer system.

Said determining method preferably further comprises a step of determining for each product 12 assigned to said batch 14 positioning spatial parameters of the product 12 with regard to the manufacturing support 18. These positioning parameters are determined depending on the determined score. Furthermore, these positioning parameters may be determined depending on supplementary parameters in addition to the score, for example to optimize the position of different products 12 having a same score.

Said positioning spatial parameters preferably comprise the position and/or the orientation of the product 12 with regard to the first surface axis X, the second surface axis Y and the depth axis Z.

Said positioning spatial parameters are optimized to reduce the surface that the manufacturing head 16 has to scan to generate the predetermined volume elements and increase the number of products 12 per manufacturing volume on the manufacturing support 18.

Figure 2:
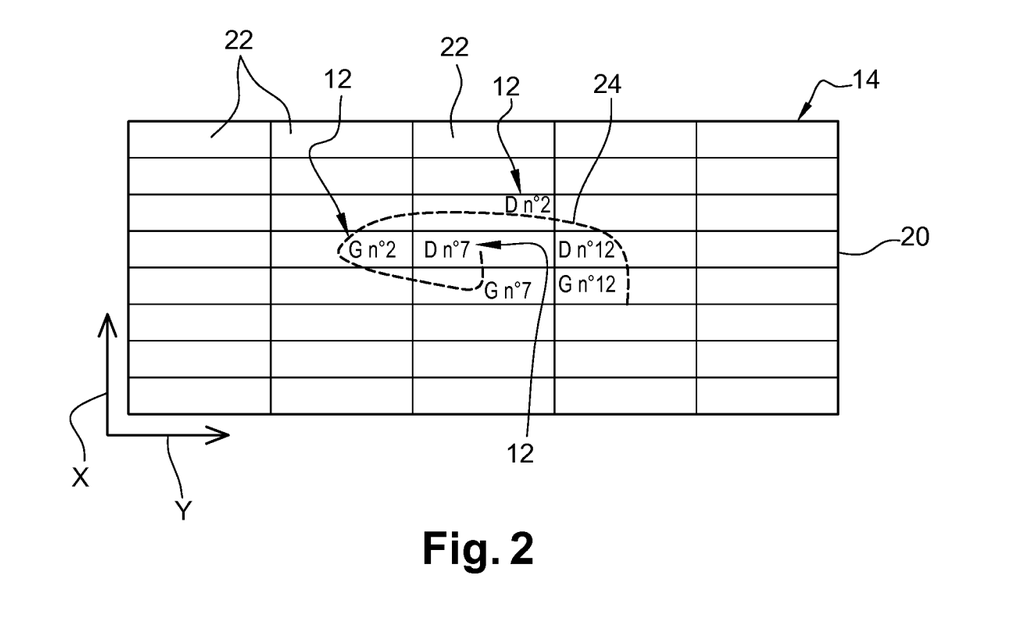
FIGS. 2 to 7 schematically show different distribution of three-dimensional products on a manufacturing support of an additive manufacturing system according to FIG. 1.

As shown on FIG. 2, the supporting surface 20 of the manufacturing support 18 is digitally divided in a plurality of slots 22. Preferably, said slots 22 are defined as a grid with the slots extending along the first X and the second Y surface axes. These slots 22 define the position of the products 12 assigned to a batch 14. Each product 12 assigned to the batch 14 is assigned to a slot 22. Preferably, the position of each product 12 is determined depending on its score. To optimize the displacements of the head manufacturing 16, the position of each product 12 in a given batch 14 is determined depending its height, or more specifically depending on its minimum NMIN and maximum NMAX numbers of layers NMIN.

Products 12 having a same or corresponding height, thus a same or corresponding minimum number of layers NMIN and a same or corresponding maximum number of layers NMAX, are preferably gathered in a same area of the supporting surface 20. In other words, products 12 having a same or corresponding height are assigned to adjacent slots 22.

Products 12 assigned to a batch 14 may be also divided in sub-batches. In other words, products 12 having corresponding or same characteristics may be gathered in different groups, or sub-batches. For example, in the case of ophthalmic lenses, products 12 having a same range of maximum numbers of layers NMAX, a same range of diameters and/or a same range of curvatures. These sub-batches are then assigned to different areas of the supporting surface 20. In doing so, a same batch 14 has different areas with corresponding manufacturing needs.

The distribution of the products 12 or the sub-batches may be set according to different profiles.

A first profile is shown on FIG. 2 and corresponds to a spiral profile. In this example, products 12 referenced as "D no7", "G no7", "G no2", "D no2", etc have been identified as having the highest scores and positioned to slots 22 following a spiral trajectory 24. Preferably, the score of the products 12 decreases along the spiral trajectory 24. The center of the spiral trajectory 24 is here positioned in a central area of the supporting surface 20. Alternatively, said center may be shifted along the first surface axis X and/or the second surface axis Y. Preferably, the maximum number of layers NMAX decreases from a central point of the manufacturing support 18 to form a spiral distribution.

Figure 3:
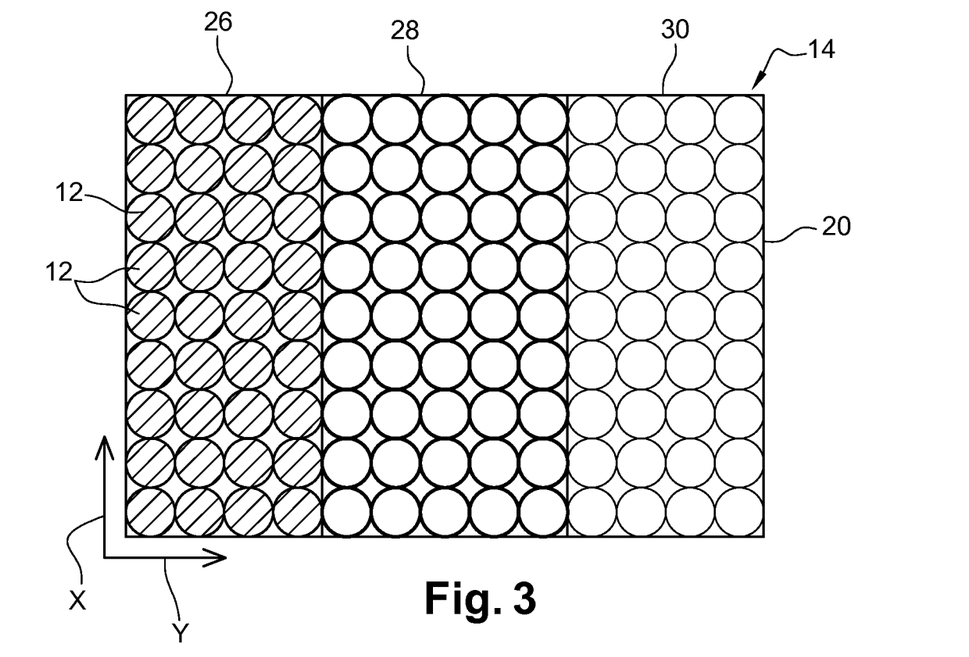

A second profile of distribution is shown on FIG. 3. This second profile correspond to a prism distribution wherein the score of the products 12 varies along the second surface axis Y. Products 12 are here distributed in a first 26, a second 28 and a third 30 sub-batches disposed adjacent to each other. Alternatively, products 12 may not be positioned in sub-batches but only positioned so that the score varies along the second surface axis Y. Alternatively, the prism distribution may extend along the first surface axis X. Preferably, the distribution is determined so that the maximum number of layers NMAX decreases along at least one of the first X and second Y surface axes. Particularly, the maximum number of layers NMAX decreases along the first X or second Y surface axis from a side area of the manufacturing support 18 to form a strip or prism distribution.

Figure 4:
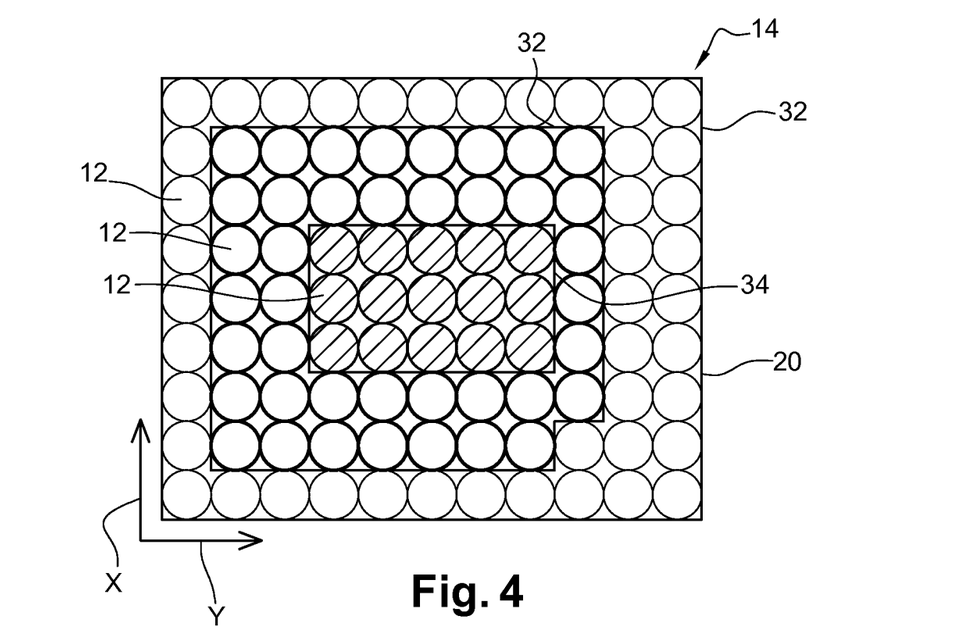

A third profile of distribution is shown on FIG. 4 and correspond to a pyramidal distribution. In this third profile, the score of the products 12 varies along both the first X and the second Y surfaces axes from a starting area or slot 22. In other words, products 12 are distributed in annular areas 32 around each other and around a central area 34. These annular areas 32 may correspond to predetermined sub-batches. Alternatively, the third profile may correspond to a portion of pyramidal distribution as a half-pyramid or a quarter-pyramid. Preferably, the maximum number of layers NMAX decreases along the first X and second Y surface axes from the central area 34 of the manufacturing support 18 to form a quasi-concentric or pyramidal distribution.

Figure 5:
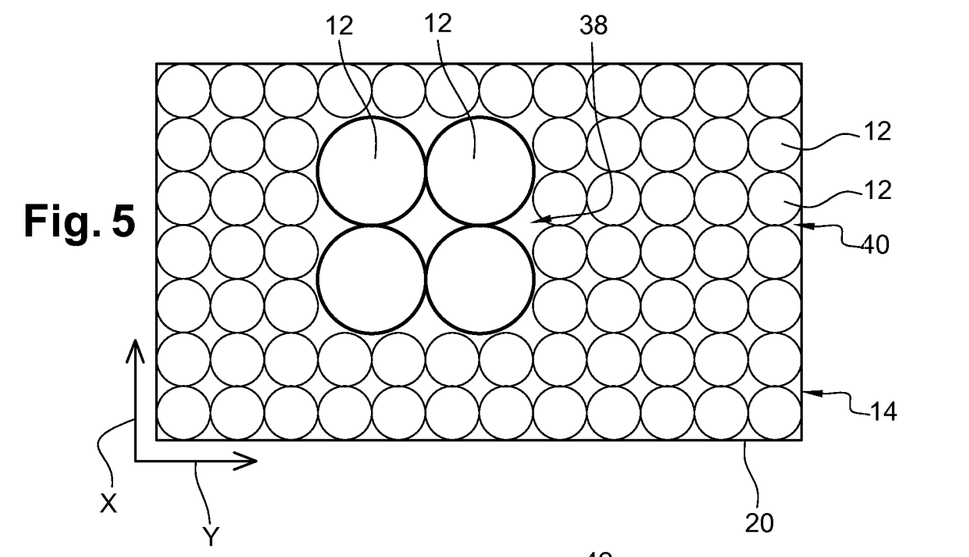

As shown on FIG. 5, products 12 may also be distributed on the supporting surface 20 depending on their dimensions along the first X and/or the second Y surface axes. In the case of ophthalmic lenses, these dimensions may correspond to the diameter of the ophthalmic lens. Here, a first plurality 38 of products 12 is gathered at a predetermined area of the supporting surface 20 and a second plurality 40 of products 12 having dimensions lower than those of the first plurality 38 is distributed around the first plurality 38.

All the distribution profiles described above may be combined on a same manufacturing support 18.

Figure 6:
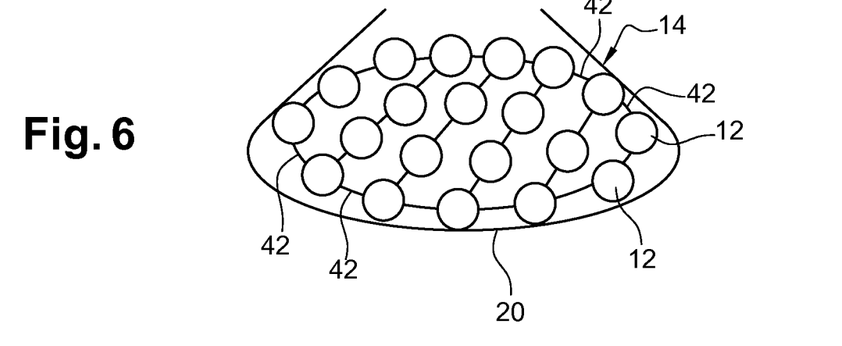

As shown on FIG. 6, the supporting surface 20 may form a container wherein the products are manufactured with a holder 42 between two adjacent products 12. These holders 42 are preferably additively manufactured with the same material as that of products 12. This bunch configuration is advantageous when a same coating has to be performed on each product 12 of the batch 14.

Figure 7:
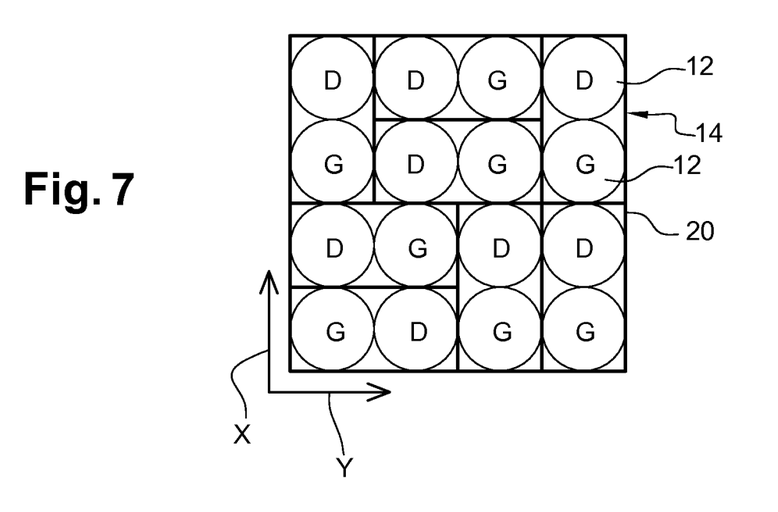

When the ordered products 12 are ophthalmic lenses, products 12 preferably comprise a pair of a left lens and a right lens of at least a same optical device. As shown on FIG. 7, the position of said left and right lenses of a same pair is preferably determined to be adjacent to each other on the supporting surface 20. In other words, left and right lenses of a same pair are preferably positioned in directly adjacent slots 22. This gathering by pairs may be combined with all the distributions described above.

Figure 8:
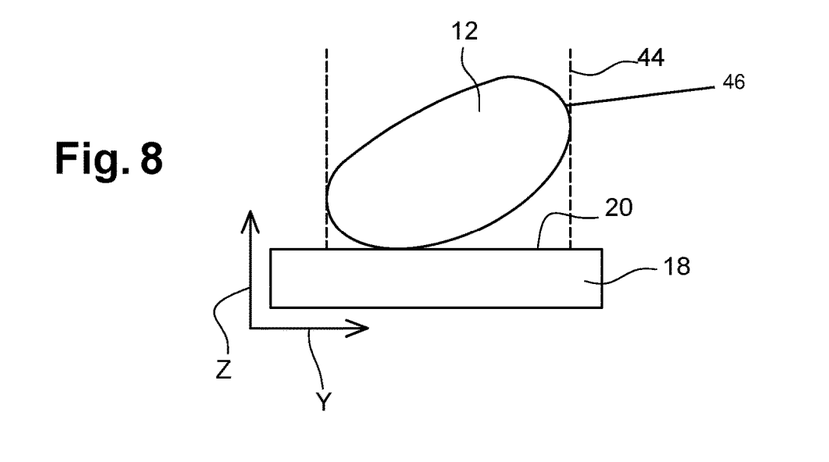
FIGS. 8 to 11 schematically show different orientations and positions of three-dimensional products on the manufacturing support of FIG. 1.

When the manufacturing head 16 provides an irradiation beam to polymerize the material, the determining method may further comprise a step of determining an operation scope of the manufacturing head 16 onto the manufacturing support 18. In this case, the manufacturing head 16 correspond to an additive manufacturing nozzle configured to irradiate the supporting surface 20 so as to generate the predetermined volume elements. As shown on FIG. 8, the orientation of each product 12 is preferably determined to optimize the operation scope 44 of the manufacturing head 16 with regard to the product 12 while reducing the height of said product along the depth axis Z. In other words, the irradiation beam of the manufacturing head 16 is determined to model a three-dimensional irradiated area, i.e. the operation scope, on top of the supporting surface 20. Then, each product 12 is oriented about the first X and/or the second Y surface axis to make the peripheral edge 46 of the product 12 included into the three-dimensional irradiated area while minimizing the position of the peripheral edge 46 along the depth axis Z. The operation scope is preferably determined with the manufacturing head disposed vertical to the slot 12 wherein the product 12 is assigned. This optimized orientation of the product 12 allows to polymerize a whole layer, or a greater part of a layer, of the product 12 with minimum displacements of the manufacturing head 16 for a given product 12.

Figure 9:
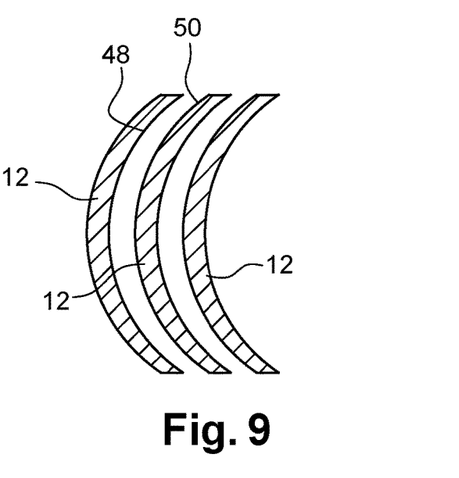
Figure 10:
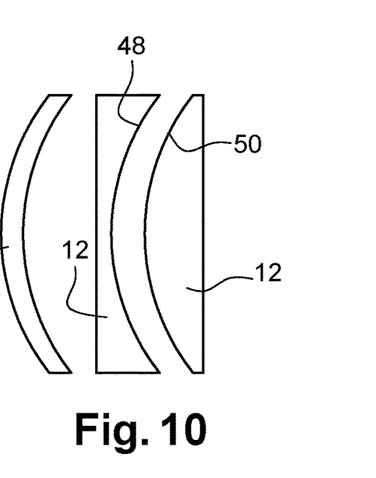

Said determining method may further comprise a step of determining if said products 12 comprise a concave 48 and/or a convex 50 surface, as shown on FIGS. 9 and 10. The position and the orientation of the products 12 are determined such that a concave surface 48 of a product 12 is adjacent to and faces a convex surface 50 of another product 12. This allows to bring adjacent products 12 closer thereby increasing the number of products 12 on a same supporting surface 20. Hence, the number n of products in a batch 14 may be increased for a same manufacturing support 18.

Figure 11:
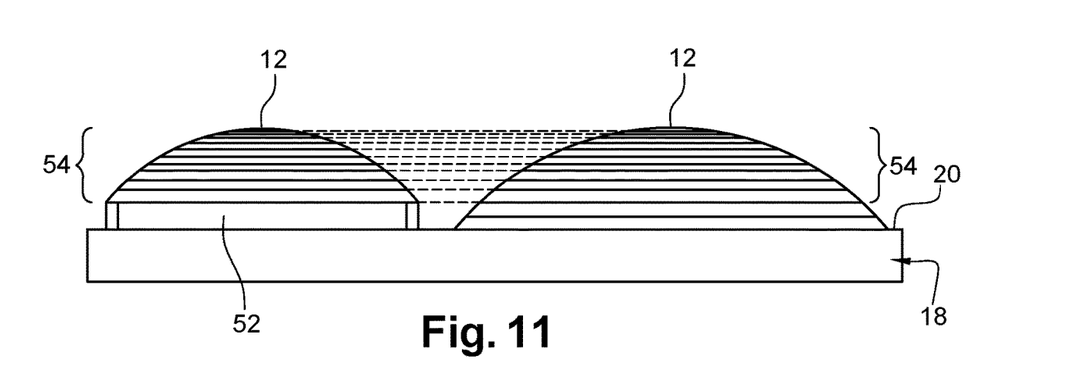

As shown on FIG. 11, products 12 having a same peripheral curvature but a different dimension along the depth axis Z may be positioned adjacent to each other to optimize the displacements of the manufacturing head 16. The product 12 having the lowest dimension along the depth axis Z is manufactured onto a supplementary support 52 having a dimension along the depth axis Z equal to the difference between the two products 12 along the depth axis Z. This strategy using a supplementary support is particularly advantageous because a same peripheral curvature of the products implies that most of the layers forming the two products have similar dimensions, particularly the same thicknesses. Hence, a same number of layers has to be generated for both products 12 so that all top layers of both products 12 may be manufactured one after the other at a same position of the manufacturing head 16 along the depth axis Z.

Thus, said determining method may further comprise a step of determining the curvature of a first and a second products 12 assigned to a batch 14. If the first and second products 12 have a same curvature, a step of determining the height of the first and second products 12 between an upper and a lower points along the depth axis Z is performed. If the first and second products 12 have a different height, a step of positioning first and second products with regard to the manufacturing support is performed such that the upper point of both the first and the second products 12 are positioned at a same height along the depth axis Z.

As a variant, after determining the curvature of a first and a second products 12 assigned to a batch 14, said determining method may further comprise, if the first and second products 12 have a same curvature, a step of determining the height of the position of the optical centers of the first and second products 12 with respect to a lower point along the depth axis Z. If the optical centers of the first and second products 12 are positioned at a different height, a step of positioning first and second products with regard to the manufacturing support is performed such that the optical centers of both the first and the second products 12 are positioned at a same height along the depth axis Z.

Said determining method is preferably comprised in a method of manufacturing an ophthalmic lens having at least one optical function. This manufacturing method comprises a step of providing an additive manufacturing machine system 10 comprising a manufacturing support 18. A batch 14 of products 12 to be manufactured onto the manufacturing support 18 is determined according to the determining method. The batch 14 of products 12 is then additively manufactured by depositing a plurality of predetermined volume elements forming a plurality of layers on the manufacturing support 18 to obtain a plurality of ophthalmic lens.

A system 10 for manufacturing in parallel the batch 14 of a number n>1 of three-dimensional products 12 by an additive manufacturing technology is further provided. Said system 10 comprises an elevator platform and a manufacturing support 18 supported on said elevator platform as well as means for selectively directing a light beam to a curable material under liquid form and curing the curable material. These means for selectively directing a light beam may correspond to the manufacturing head 16 described above.

Said system also comprises a controller adapted for setting a plurality of placement zones or slots 22 in the formation area. The placement zones or slots 22 are defined by borderlines extending in an extension direction of a recoater for leveling a liquid surface. Said controller comprises means for receiving orders for manufacturing a three-dimensional product 12 by the additive manufacturing technology and means for determining a score associated with said three-dimensional product 12 from a set of data comprised in said order. Said score is preferably representative of at least one product's characteristic. The controller further comprises means for assigning to said batch n products having a corresponding score, when said ordered three-dimensional product list comprises at least n three-dimensional products. The controller also comprises means for placing three-dimensional products 12 of said batch on the manufacturing support according to said determined score and an additive manufacturing machine for manufacturing the ordered three-dimensional products 12.

Moreover, a "sur-booking" strategy may be provided to the determining method to reduce unoccupied slots 22 on the manufacturing support 18. Furthermore, each product 12 is preferably marked after additive manufacturing to make its identification possible.

The invention claimed is:
1. A method implemented by a computer configured to determine a batch of a number n>1 of three-dimensional products to be manufactured by an additive manufacturing technology, said method comprising:
receiving at least one order for manufacturing a product by the additive manufacturing technology;
determining a score associated with said product from a set of data comprised in said at least one order, said score being a value representative of at least one characteristic of the product;
assigning to said batch n products each having a same score;
determining, for each product assigned to said batch, positioning spatial parameters of a product model corresponding to the product with regard to a virtual representation of a manufacturing support of the additive manufacturing machine depending on the determined score, said manufacturing support defining a first surface axis, a second surface axis, and a depth axis orthogonal to the first and second surface axes, said positioning spatial parameters comprising one or more of a position and an orientation of the product model corresponding to the respective product with regard to the first surface axis, the second surface axis, and the depth axis;
determining that the respective curvature of one or more of a front face and a back face of a respective first product model corresponding to a first product and a respective second product model corresponding to a second product assigned to the batch have a same curvature, the first product model and the second product model having different dimensions;

determining a respective height of a position of each of the optical centers of the first and second product models respectively corresponding to the first and second products with respect to a lower point along the depth axis, after the determining that the respective curvatures have the same curvature;

determining that the optical centers of the first and second product models respectively corresponding to the first and second products have different determined height distances with respect to the lower point along the depth axis;

providing an additive manufacturing machine with the set of data of each of the products assigned to the batch; and additively manufacturing each of the products assigned to the batch in a same additively manufacturing operation by irradiating the manufacturing support with an irradiation beam from the manufacturing head, the additive manufacturing including varying the position of the manufacturing support to obtain the first and second products positioned with the optical centers of both the first and second products at a same distance along the depth axis.

2. The method of claim 1, wherein the score is determined based on one or more of:

at least one geometric characteristic of the product that is one of a power of an ophthalmic lens, the curvature of one or more of the first face and the second face of the ophthalmic lens, and at least one dimension of the ophthalmic lens, at least one added value to be provided to the product, the at least one added value being a feature including one of an anti-scratch layer, an anti-shock layer, a tinted layer or dye, a photochromic layer or dye, a polarized layer, an antistatic layer, an anti-reflective layer or stack, a mirror or partial mirror layer, and a filtering layer, at least one manufacturing characteristic of the product, the at least one manufacturing characteristic comprises one of a minimum number of layers required to manufacture the three-dimensional product, a maximum number of layers required to manufacture the three-dimensional product, a post-processing operation, a property of a base lens on which an ophthalmic lens is to be manufactured, and the material of the ophthalmic lens, and the priority with which the product is to be manufactured.

3. The method according to claim 2, further comprising determining a rank for said product in an ordered product list according to said determined score, each product being assigned to said batch depending on the rank of the respective product in the ordered product list.

4. The method according to claim 2, wherein the three-dimensional products are ophthalmic lenses.

5. The method according to claim 4, further comprising determining a rank for said product in an ordered product list according to said determined score, each product being assigned to said batch depending on the rank of the respective product in the ordered product list.

6. The method according to claim 4, wherein:

the at least one manufacturing characteristic comprises one of a minimum number of layers required to manufacture the three-dimensional product, a maximum number of layers required to manufacture the three-dimensional product, a post-processing operation, a property of the base lens on which the ophthalmic lens is to be manufactured, and the material of the ophthalmic lens.

7. The method of claim 6, wherein the position of each product assigned to said batch is determined such that a number of layers decreases along at least one of the first and second surface axes in relation to the maximum number of layers.

8. The method according to claim 6, wherein the products comprise a pair of a left lens and a right lens of a same optical device, a position of said left lens and a position of the right lens of a same pair being determined to be adjacent to each other in the additive manufacturing machine.

9. The method according to claim 6, further comprising determining when said product models of the products comprise one or more of a concave surface and a convex surface, a position and an orientation of the products in the additive manufacturing machine being determined such that the concave surface of one of the products is adjacent to and faces the convex surface of another one of the products.

10. The method according to claim 6, further comprising determining a rank for said product in an ordered product list according to said determined score, each product being assigned to said batch depending on the rank of the respective product in the ordered product list.

11. The method according to claim 1, further comprising determining a rank for said product in an ordered product list according to said determined score, each product being assigned to said batch depending on the rank of the respective product in the ordered product list.

12. The method according to claim 1, wherein products assigned to said batch are divided in sub-batches having one or more of: a same range of maximum numbers of layers, a same range of diameters, and a same range of curvatures of the respective first faces or the respective second faces of the first arid second product models of the first and second products.

13. A method of manufacturing an ophthalmic lens having at least one optical function, the method comprising:

determining the batch of products to be manufactured onto the manufacturing support according to the method of claim 1; and providing the additive manufacturing machine comprising the manufacturing support, wherein the batch of products is additively manufactured by depositing a plurality of predetermined volume elements forming a plurality of layers on the manufacturing support to obtain a plurality of ophthalmic lens.

14. The method according to claim 1, wherein the three-dimensional products are ophthalmic lenses.

15. The method according to claim 1, wherein the additively manufacturing including manufacturing one of the products having the product model with a lowest dimension along the depth axis onto a supplementary support having a dimension along the depth axis equal to a difference between the two products along the depth axis.

* * * * *